US006647053B1

(12) United States Patent
Garces

(10) Patent No.: US 6,647,053 B1
(45) Date of Patent: Nov. 11, 2003

(54) METHOD AND SYSTEM FOR CHANNEL MASKING IN A COMMUNICATION NETWORK

(75) Inventor: Rodrigo Garces, Santa Cruz, CA (US)

(73) Assignee: Ricochet Networks, Inc., Denver, CO (US)

( * ) Notice: Subject to any disclaimer, the term of this patent is extended or adjusted under 35 U.S.C. 154(b) by 317 days.

(21) Appl. No.: 09/652,856

(22) Filed: Aug. 31, 2000

(51) Int. Cl.[7] ................................................. H04B 1/69
(52) U.S. Cl. ........................ 375/132; 455/422; 455/450; 455/452.2; 370/332
(58) Field of Search .................... 455/62, 422, 450, 455/452; 375/132, 138; 370/319, 321, 328, 330, 332, 333, 338, 344

(56) References Cited

U.S. PATENT DOCUMENTS

| 4,577,310 | A | * | 3/1986 | Korsky et al. ............... 370/359 |
| 4,718,081 | A | * | 1/1988 | Brenig ........................ 455/438 |
| 4,780,885 | A | * | 10/1988 | Paul et al. .................. 375/267 |
| 4,850,036 | A | | 7/1989 | Smith |
| 5,129,096 | A | | 7/1992 | Burns |
| 5,257,399 | A | | 10/1993 | Kallin et al. |
| 5,280,288 | A | * | 1/1994 | Sherry et al. ................. 342/83 |
| 5,355,522 | A | | 10/1994 | Demange |
| 5,513,183 | A | | 4/1996 | Kay et al. |
| 5,515,369 | A | | 5/1996 | Flammer, III et al. ..... 370/69.1 |
| 5,541,954 | A | * | 7/1996 | Emi ............................. 375/133 |
| 5,546,422 | A | * | 8/1996 | Yokev et al. ................ 375/134 |
| 5,619,493 | A | | 4/1997 | Ritz et al. |
| 5,682,605 | A | | 10/1997 | Salter |
| 5,737,358 | A | | 4/1998 | Ritz et al. |
| 5,805,633 | A | | 9/1998 | Uddenfeldt |
| 5,831,976 | A | * | 11/1998 | Lin et al. ..................... 370/329 |
| 5,859,840 | A | | 1/1999 | Tiedemann, Jr. et al. |
| 5,937,002 | A | | 8/1999 | Andersson et al. |
| 6,023,462 | A | | 2/2000 | Nieczyporowicz et al. |
| 6,101,466 | A | * | 8/2000 | Rao et al. .................... 704/233 |
| 6,240,125 | B1 | | 5/2001 | Andersson et al. |
| 6,252,861 | B1 | * | 6/2001 | Bernstein et al. ........... 370/331 |
| 6,272,313 | B1 | * | 8/2001 | Arsenault et al. .......... 455/3.02 |

OTHER PUBLICATIONS

Kahn, Robert E., et al., *Advances in Packet Radio Technology*, Proceedings of the IEEE, Nov. 1978, vol. 66, No. 11.

* cited by examiner

Primary Examiner—William Trost
Assistant Examiner—James D Ewart
(74) Attorney, Agent, or Firm—Townsend and Townsend and Crew LLP

(57) ABSTRACT

A method and a system for determining a channel mask in a network device in a microcellar network are provided. An exemplary embodiment uses a weighted average of the background noise on a channel of the network device to determine whether the channel should be masked out. One embodiment provides a method for determining a group of channels from a plurality of frequency hopping channels received by a wireless communications device, the channels in the group being excluded from receipt by the wireless communications device. The method includes the steps of determining an indicator based on a received noise measurement at a first time for a channel, then determining a weighted average at a second time for the channel, the weighted average including the indicator, and then selecting the channel as a member of the group, upon an indication that the weighted average at the second time is above a threshold.

11 Claims, 3 Drawing Sheets

METHOD AND SYSTEM FOR CHANNEL MASKING IN A COMMUNICATION NETWORK

BACKGROUND OF THE INVENTION

This invention relates to wireless digital communication systems, and in particular to microcellular packet communication systems, employing frequency hopping spread spectrum techniques.

As personal wireless communication systems such as in cellular telephony proliferate, the spectrum available to the wireless user for accessing cell sites for interactive communication becomes premium. There is great pressure to shrink the cell size of cellular telephone systems, for example, in order to promote frequency reuse and ultimately increase user density and capacity, as well as to reduce the required transmitter power for battery-operated portables. This is part of the trend toward so-called microcellular systems.

An example of such a microcellular system is U.S. Pat. No. 5,515,369 entitled "Method For Frequency Sharing And Frequency Punchout In Frequency Hopping Communications Network" inventor George Flammer, III, et. al. issued May 7, 1996, (herein "Flammer") which is herein incorporated by reference. Flammer describes a wireless packet communication system having a plurality of nodes, each having a transmitter and a receiver, the receiver at each node is assigned a seed value and is provided with a channel punchout mask, i.e., channel mask. A node uses its seed value and channel mask to generate a specific randomly ordered channel hopping band plan on which to receive signals. A node transmits its seed value and channel mask to target nodes with which it wants to establish communication links, and those target nodes each use the seed value and channel mask to generate the randomly ordered channel hopping band plan for that node.

A problem in a microcellular system is foreign interference, namely interference which is from transmitters outside of the control of network devices of the microcell system. Some of these interferers may share some of the frequency hopping channels of one or more network devices and cause errors in data received by the network devices. Thus there is a need to identify interference on channels of a network device and to adjust the channel mask of the device to reduce the interference.

SUMMARY OF THE INVENTION

The present invention provides a method and a system for determining a channel mask in a network device in a microcellular network. An exemplary embodiment uses a weighted average of the background noise on a channel of the network device to determine whether a particular channel should be masked out.

One embodiment of the present invention provides a method for selecting a group of channels from a plurality of frequency hopping channels received by a wireless communications device, the channels in the group being excluded from receipt by the wireless communications device. The method includes the steps of determining an indicator based on a received noise measurement at a first time for a channel, then determining a weighted average at a second time for the channel, the weighted average including the indicator, and then selecting the channel as a member of the group, upon an indication that the weighted average at the second time is above a threshold. The threshold may include a fixed number above a noise floor. The noise floor is a minimum of the weighted averages, where a weighted average is determined for each channel. The threshold may be increased by a unit until the frequency hopping channels, excluding the group of channels, are greater than or equal to a number N.

In another embodiment, a network device for determining a channel mask in a microcellular communications network is provided. The network device includes a digital signal processor (DSP) and a memory. The DSP has a component, which could be software, to measure background noise for a frequency at various times. The memory has software including a data structure having a weighted average of background noise for the frequency and selection software for setting the frequency as a hopping frequency of the channel mask, when the weighted average is below a threshold.

A further understanding of the nature and advantages of the inventions herein may be realized by reference to the remaining portions of the specification and the attached drawings.

DESCRIPTION OF THE SPECIFIC EMBODIMENTS

Figure 1:
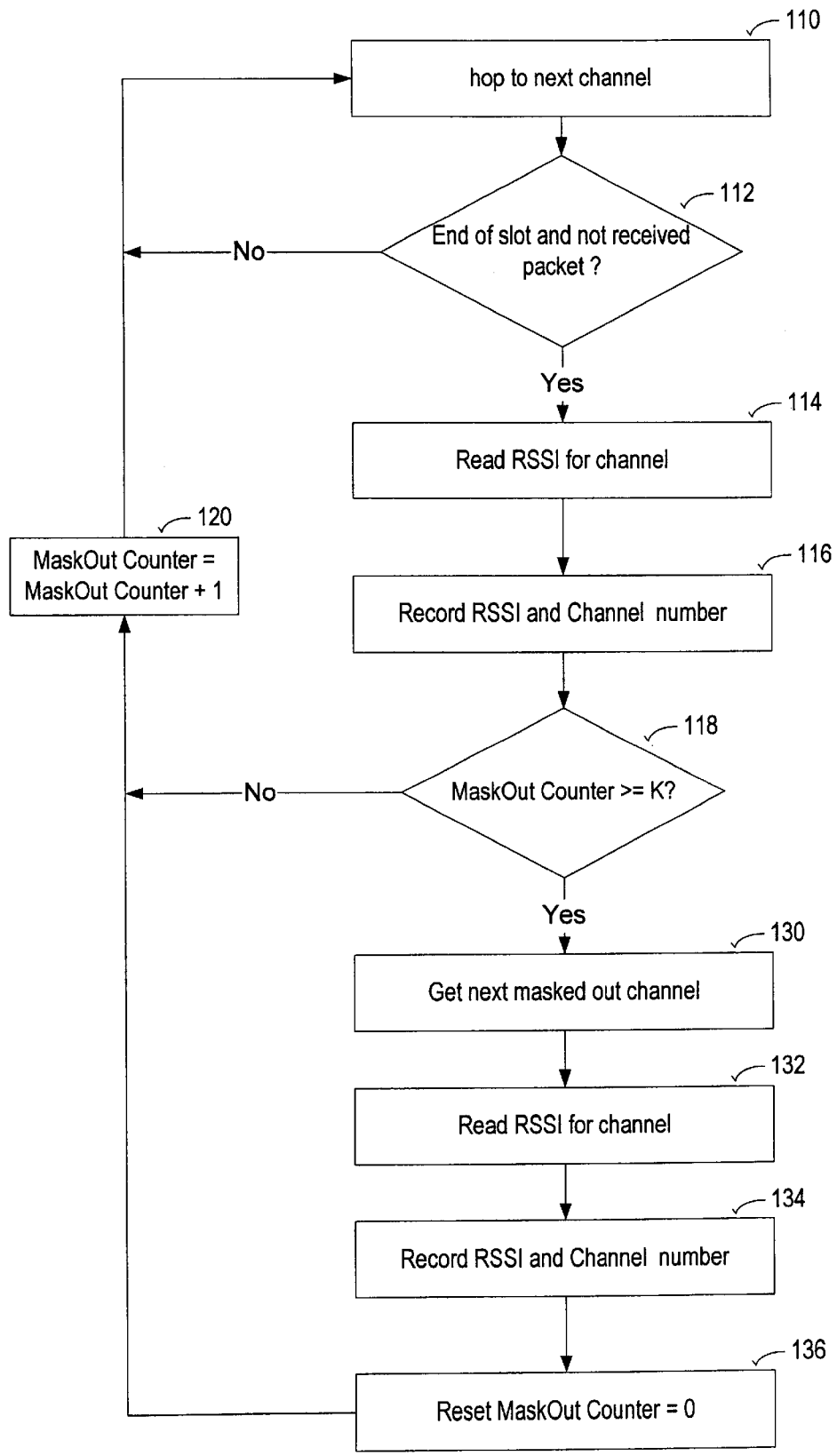
FIG. 1 illustrates a flowchart for determining the measured RSSI of an embodiment of the present invention.

In an embodiment of the present invention a microcellular network similar in function to Flammer is used in the 2.4 GHz Industrial, Scientific, Medical (ISM) band. Network devices are allowed to transmit in any of the N1 channels available in the 2.4 GHz band, where N1 is an integer, for example, N1=260. Each network device has a unique channel mask. The channel mask is the receiving mask of the network device and determines its hopping sequence. The mask includes a plurality of bits, with one bit per channel. A bit set to "1" indicates that the channel is not masked, i.e., the network device may hop to this channel and receive data. The mask may be stored in a current mask register at the network device. In another embodiment the network devices use the 900 MHz ISM band and/or a bit set to "0" indicates that the channel is not masked.

In one embodiment, the foreign interference may be measured at a network device per a channel by measuring the signal power received when there is no packet transfer on the channel to the network device from another device in the microcellular system. This measure is called a Received Signal Strength Indication (RSSI). The RSSI is determined by a digital signal processor (DSP) chip, such as Texas Instruments Incorporated TMS320VC549, in the network device. The DSP chip calculates the power at the analog to digital converter and subtracts the gain at the receiver. This chip is calibrated in the lab for room temperature against known signal strengths, so that the RSSI can be calculated within, for example, 3 to 4 dBm of accuracy at room temperature. The RSSI-to-dBm conversion is done using linear interpolation.

In one embodiment the measured RSSI, measured in negative dBm, is used as a measure of the background noise for one or more channels of the plurality of frequency hopping channels of a network device. The background noise includes interference from transmitters other than the network device's transmitters. The network device while frequency hopping, remains at a frequency where it can receive for an interval of time, i.e., slot, for example, 25 milliseconds, before the device hops to another channel. In one embodiment, if no data is received during most of this slot, then the background noise is measured resulting in a measured RSSI for this channel.

In another embodiment each network device makes multiple measured RSSI readings for each channel in the 2.4 GHz Band. A network device reads a measured RSSI value from the DSP only if it has been substantially idle in the current hopping channel. Thus the reading takes place right before the radio hops to its next channel. The reading as well as the channel number is stored in a table or queue, for example Table 1 below, where, for example, N1=260. In order to collect measured RSSI samples for channels that have been masked out, an array containing the number of the masked out channel is implemented. A counter is increased each time that the radio goes to the next unmasked channel. When the counter reaches a number K, for example 100, a masked out channel is selected from the array and a measured RSSI value is collected. This ensures that we have RSSI measurements for each channel in the band. The network devices collect raw RSSI values continuously.

TABLE 1

Measured RSSI

| Channel i | RSSI Value, $y_n(i)$ |
|---|---|
| 1 | −105 dBm |
| ... | |
| 170 | −90 dBm |
| ... | |
| 197 | −102 dBm |
| ... | |
| N1 | −101 dBm |

FIG. 1 illustrates a flowchart for determining the measured RSSI of an embodiment of the present invention. In this embodiment the network device continuously hops from channel to channel, i.e., frequency to frequency, according to its hopping sequence. The channels in the hopping sequence are those channels that are turned on, for example, have their bits set to "1," by the current channel mask. At step 110, the network device hops to the next channel as determined by the current channel mask. The network device then checks if, by the end or substantially near the end of the slot (time period that network device is at a channel), a packet has been received (step 112). If no packet has been received, then at step 114, the measured RSSI is read for that channel from the DSP. At step 116 the measure RSSI and the related channel number are recorded in a memory of the network device, for example, in a data structure such as Table 1 above. At step 118 the MaskedOutCounter, which was initialized to zero, is compared to K, an integer, for example, K=500. If the MaskedOutCounter is equal to or greater than K, then a channel not in the current mask, i.e., masked out, is chosen (step 130). Next the background noise is measured by a determining the RSSI for that channel. (step 132), and at step 134 the RSSI and related masked channel number are recorded, for example in Table 1. "$y_n(i)$" is the measured RSSI for the "i th" channel at the "n th" discrete time. At step 136 the MaskedOutCounter is reset to zero and at step 120 the MaskedOutCounter is incremented by one. The network device then hops to the next channel (step 110). If at step 112 a packet is received in the slot, then the network device hops to the next channel (step 110). If at step 118 the MaskedOutCounter is less than K, then the MaskedOutCounter is incremented by one (step 120), and step 110 is next performed.

While the task illustrated in FIG. 1 is executing, a separate concurrently running task, in an embodiment, determines a weighted average RSSI for each channel, using the associated measured RSSI for that channel. In one embodiment the average RSSI is calculated by reading the measured RSSI, i.e., $y_n(i)$ stored in a table or queue, for example Table 1, and adding this value to a weighted RSSI average for that channel to give a new RSSI average for that channel. This new average RSSI for the channel is stored in a second table or queue, for example Table 2. Thus Table 2 has the average RSSI per channel for each of the N2 channels. In one embodiment N2=N1.

TABLE 2

| | Average RSSI |
|---|---|
| Channel i | Weighted Average, $x_n(i)$ |
| 1 | −102.5 dBm |
| ... | |
| 170 | −92 dBm |
| ... | |
| 197 | −101 dBm |
| ... | |
| N2 | −103 dBm |

Figure 2:
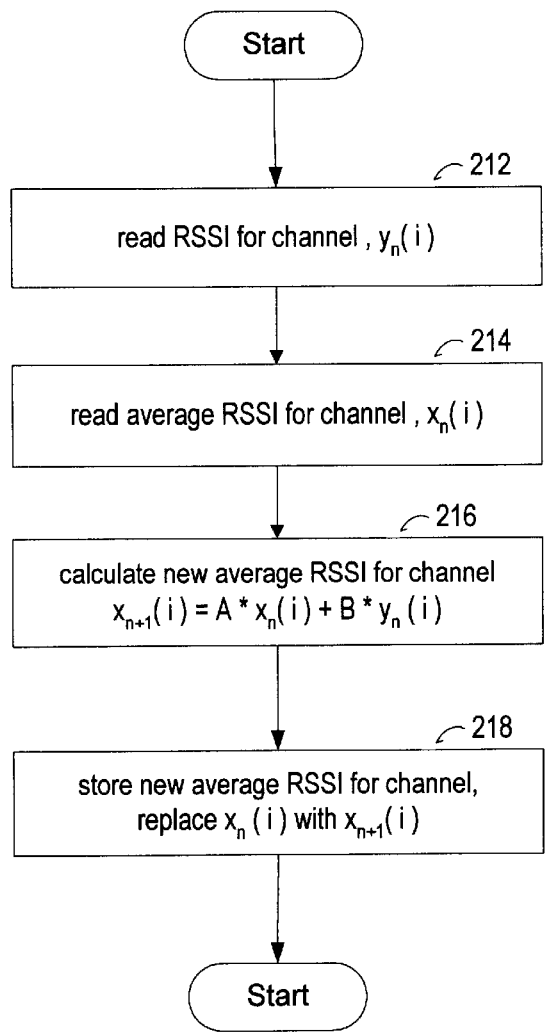
FIG. 2 illustrates a flowchart for determining the average RSSI for one embodiment of the present invention.

FIG. 2 illustrates a flowchart for determining the average RSSI for one embodiment of the present invention. In FIG. 2 "i," "n," "A," and "B" are integers. The values of "A" and "B", may be, for example, A=⅞ and B=⅛. "i" is a channel index number representing a channel number and "n" is a time index number representing a discrete time. At step 212 the measured RSSI is read for channel "i", i.e., $y_n(i)$, from for example Table 1, where i=1 to N1. At step 214 the current average RSSI, i.e., RSSI at time "n," for channel "i", i.e., $x_n(i)$, is read, from for example Table 2. The following formula is applied to calculate the new average RSSI, i.e., $x_{n+1}(i)$, for channel "i" at the new time "n+1" (step 216):

$$x_{n+1}(i) = [A * x_n(i)] + [B * y_n(i)]$$

The new average RSSI for that channel is stored at step 218, by replacing $x_n(i)$ with $x_{n+1}(i)$ in Table 2. Thus Table 2 shows a running weighted average RSSI for each of the N2 channels, where, for example N2=260. The steps 212 to 218 are repeated for each channel "i,", that has a change in $y_n(i)$.

In an embodiment of the present invention, another independent task runs every, for example, 24 hours. This task determines if the current mask should be changed due to a change in the background noise. First, the current RSSI floor is calculated. The RSSI floor is the minimum average RSSI for all the channels, for example, the minimum x(i) in Table 2. A threshold, for example, the floor plus an offset is determined, where the offset may be 15 dBm. All channels below the threshold, are good channels to receive data and to hop to by the network device. The channels with the average RSSI above the threshold are candidates to be masked out, i.e., bad. The good and bad channels are stored in a proposed channel mask register. For example, if there are 260 channels, and the floor is −108 dBm, then the threshold is −108 dBm+15 dBm=−93 dBm, and all channels above −93 dBm are bad channels and those below −93 dBm are good channels. For example, in a proposed channel mask having at least 260 bits, the good channels would have bits set to "1" and the bad, bits set to "0."

If the number of channels that are below the threshold is greater than or equal to L, where L=75 for example, the minimum number of channels currently required by the FCC, then this threshold is used. If the number of channels that are below the threshold is less than L, the threshold is repetitively increase by one dBm until at least L channels are good. The bits in a proposed channel mask register are not masked out for each channel below the threshold and masked out for those channels above the threshold. This proposed channel mask register is compared with the current mask register, having the current mask. If there is difference between the proposed and current mask registers of at least 10% of the bits, the proposed mask register is written to the current mask register. For example, for 260 channels, 10% is 26 channels (or 26 bits in the mask registers). If there is less than 10% difference than, this task goes to sleep for 24 hours.

Figure 3:
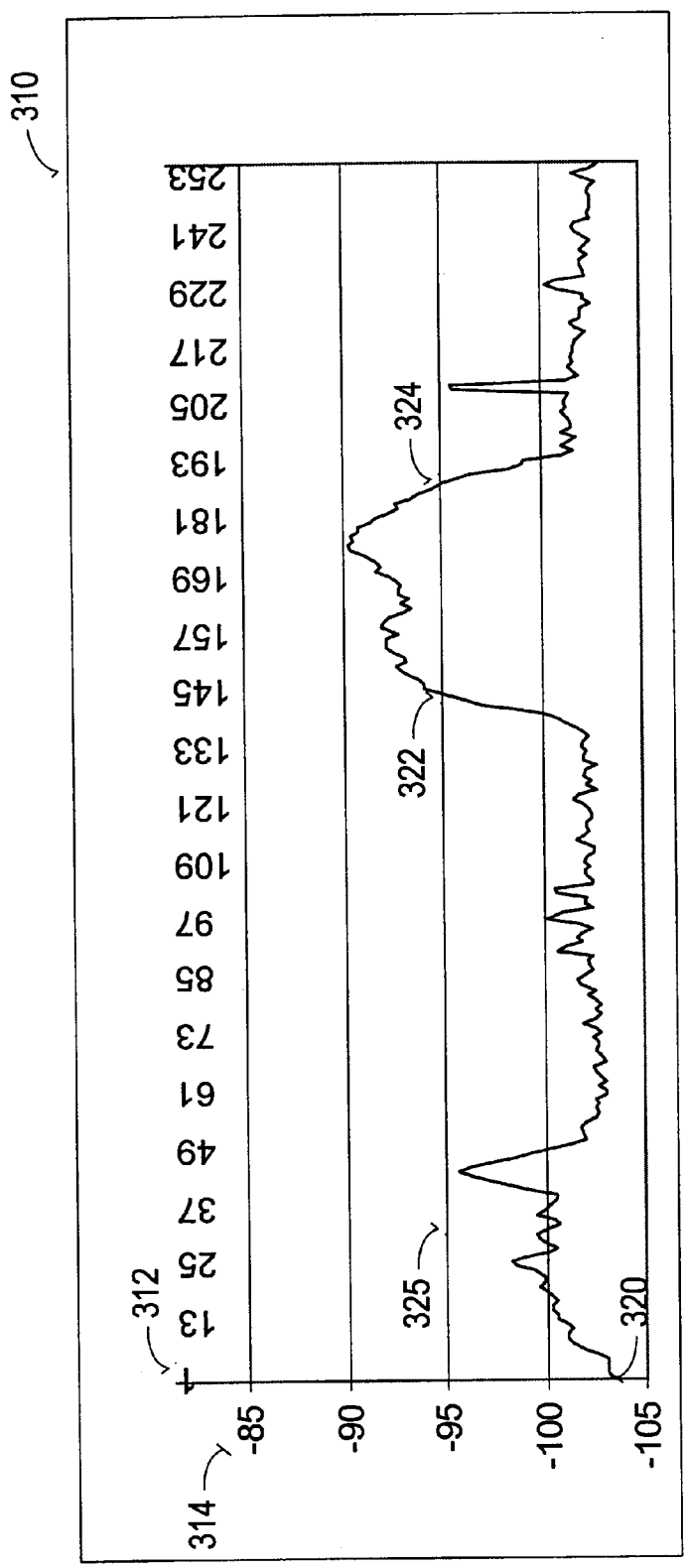
FIG. 3 shows an example of average RSSI's for each channel of a plurality of frequency hopping channels of one embodiment of the present invention.

FIG. 3 shows an example of average RSSI's for each channel of a plurality of frequency hopping channels of one embodiment of the present invention. The x-axis 312 includes a series of channels from 1 to about 260. The y-axis 314 has measurements in a minus dBm which indicates the background noise power received by the network device in a channel. A goal is to keep the noise low, i.e., being more negative on the y-axis 314 means lower noise. A point on the graph, for example 320, illustrates the background noise level, e.g., about −103 dBm, for a channel such as channel 1. The graph between 322 and 324 shows those channels which are above a threshold of −95 dBm 325. This threshold of −95 dBm was calculated based on a floor of −103 dBm and an offset of 8 dBm. If as FIG. 3 illustrates the channels that may be masked out are, for example, 144 to 190, then the threshold would be acceptable as only 46 channels of the 260 channels would be masked out.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A network device for determining a channel mask in a microcellar communications network, wherein said channel mask selects hopping frequencies of a plurality of frequencies of the network device, said network device comprising:
   a digital signal processor comprising a component to measure background noise for a first frequency of said plurality of frequencies at a first time of a plurality of times; and
   a memory storing software comprising:
      a data structure comprising a first time weighted average of background noise for said first frequency, said first weighted average based on background noise for said first frequency at said first time; and
      selection software for setting said first frequency as a hopping frequency of said channel mask, when said first weighted average is below a threshold and for increasing the threshold by a unit until the selected hopping frequencies is greater than or equal to N frequencies.

2. The network device of claim 1:
   wherein said component measures background noise for a second frequency of said plurality of frequencies at a first time of a plurality of times;
   said data structure further comprises a second weighted average of background noise for said second frequency, said second weighted average based on background noise for said second frequency at said first time; and
   said threshold is based on a fixed offset and a minimum of said first weighted average and said second weighted average.

3. The network device of claim 1 wherein said component is code stored in a digital signal processor memory and wherein the code is executed within the digital signal processor.

4. A method for determining a group of channels from a plurality of frequency hopping channels received by a wireless communications device, wherein channels in the group are excluded from receiving by said wireless communications device, the method comprising:
   determining an indicator at a first time for a channel of said plurality of frequency hopping channels, wherein said indicator is based on a received noise measurement at said first time for said channel;
   determining a weighted average at a second time for said channel, wherein said weighted average at said second time comprises said indicator;
   selecting said channel as a member of said group, when said weighted average at said second time is above a threshold; and
   increasing said threshold by a unit until a remaining number of said plurality of frequency hopping channels, excluding said group of channels, is greater than or equal to N channels.

5. The method of claim 4 wherein said group is part of a channel mask of said wireless communications device.

6. The method of claim 4 further comprising:
   determining a weighted average at said first time for said channel; and wherein said weighted average at said second time is said weighted average at said first time added to said indicator.

7. The method of claim 4 wherein said threshold comprises a fixed number above a noise floor, wherein said noise floor is a minimum weighted average of a plurality of weighted averages, and wherein the plurality of weighted averages is determined by calculating one weighted average per channel for each channel of the plurality of frequency hopping channels.

8. The method of claim 4 wherein said unit is 1 dBm and N is 75.

9. The method of claim 4 wherein said unit is an integer, and wherein the noise measurement may be expressed in decibels (dBm).

10. A network device for determining a channel mask in a microcellar communications network, wherein said channel mask selects hopping frequencies of a plurality of frequencies of the network device, said network device comprising:

a digital signal processor comprising a component to measure background noise for a first frequency of said plurality of frequencies at a first time of a plurality of times; and a memory storing software comprising:

a data structure comprising a first weighted average of background noise for said first frequency, said first weighted average based on background noise for said first frequency at said first time; and selection software for setting said first frequency as a hopping frequency of said channel mask, when said first weighted average is below a threshold;

wherein said background noise is measured when there is no data received during a substantial duration of the time said network device remains at said first frequency.

11. A computer program product for determining a group of channels from a plurality of frequency hopping channels received by a wireless communications device, wherein channels in the group are excluded from receiving by said wireless communications device, the method comprising:

code for determining an indicator at a first time for a channel of said plurality of frequency hopping channels, wherein said indicator is based on a received noise measurement at said first time for said channel;

code for determining a time weighted average at a second time for said channel, wherein said weighted average at said second time comprises said indicator;

code for selecting said channel as a member of said group, when said weighted average at said second time is above a threshold;

code for increasing the threshold by a unit until a remaining number of said plurality of frequency hopping channels, excluding said group of channels, is greater than or equal to N channels; and a computer readable storage medium for storing the codes.

* * * * *